(12) United States Patent
Seo et al.

(10) Patent No.: US 12,122,406 B2
(45) Date of Patent: Oct. 22, 2024

(54) INFORMATION DISPLAY DEVICE

(71) Applicant: HONDA MOTOR CO., LTD., Tokyo (JP)

(72) Inventors: Toshiaki Seo, Saitama (JP); Minoru Higuchi, Saitama (JP); Shinichi Murakami, Saitama (JP); Koji Dan, Saitama (JP); Ryo Iitaka, Saitama (JP); Takashi Adachi, Saitama (JP); Takaya Yamazaki, Saitama (JP); Aya Sasaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 17/988,287

(22) Filed: Nov. 16, 2022

(65) Prior Publication Data
US 2023/0150528 A1 May 18, 2023

(30) Foreign Application Priority Data
Nov. 18, 2021 (JP) .................. 2021-187498

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60K 35/10* (2024.01); *B60K 35/28* (2024.01);
(Continued)

(58) Field of Classification Search
CPC ........... B60W 50/14; B60W 2050/146; B60W 2540/225; B60W 2554/4041; B60W 2554/4044; B60W 2554/4045; B60W 2556/10; B60K 35/00; B60K 35/10; B60K 35/28; B60K 35/29; B60K 35/81; B60K 2360/149; B60K 2360/179;
(Continued)

(56) References Cited

U.S. PATENT DOCUMENTS

2015/0360565 A1\* 12/2015 Goto ..................... G02B 27/01
701/36
2018/0174463 A1\* 6/2018 Ohta ....................... G06T 7/593
(Continued)

FOREIGN PATENT DOCUMENTS

JP 2021117704 A 8/2021

*Primary Examiner* — Omeed Alizada
(74) *Attorney, Agent, or Firm* — Armstrong Teasdale LLP

(57) ABSTRACT

An information display device includes a display unit configured to display information about an object such that the information about the object at least partially overlaps with forward view of a user, and a controller configured to control display of the display unit. The controller is configured to estimate or acquire a prospective moving direction of the object, acquire a sight-line frequency representing a frequency with which a sight-line of the user is directed to the object within a prescribed period, determine whether the sight-line frequency is equal to or more than a prescribed frequency threshold, and cause the display unit to display the prospective moving direction of the object at least on condition that the controller determines that the sight-line frequency is less than the frequency threshold.

13 Claims, 10 Drawing Sheets

(51) Int. Cl.
*B60K 35/10* (2024.01)
*B60K 35/28* (2024.01)
*B60K 35/29* (2024.01)
*B60K 35/81* (2024.01)

(52) U.S. Cl.
CPC .............. *B60K 35/29* (2024.01); *B60K 35/81* (2024.01); *B60K 2360/149* (2024.01); *B60K 2360/179* (2024.01); *B60K 2360/1868* (2024.01); *B60K 2360/188* (2024.01); *B60W 2050/146* (2013.01); *B60W 2540/225* (2020.02); *B60W 2554/4041* (2020.02); *B60W 2554/4044* (2020.02); *B60W 2554/4045* (2020.02); *B60W 2556/10* (2020.02)

(58) Field of Classification Search
CPC ...... B60K 2360/1868; B60K 2360/188; B60K 35/23; B60K 35/22; B60K 37/00; B60K 2360/16; B60K 2360/18; B60R 1/22; B60R 1/29; B60R 16/023; B60R 2300/30; B60R 2300/80; G08G 1/166
See application file for complete search history.

(56) References Cited

U.S. PATENT DOCUMENTS

2019/0278080 A1* 9/2019 Ishibashi ................ G08G 1/166
2020/0361482 A1* 11/2020 Choi .................... G01C 21/365

\* cited by examiner

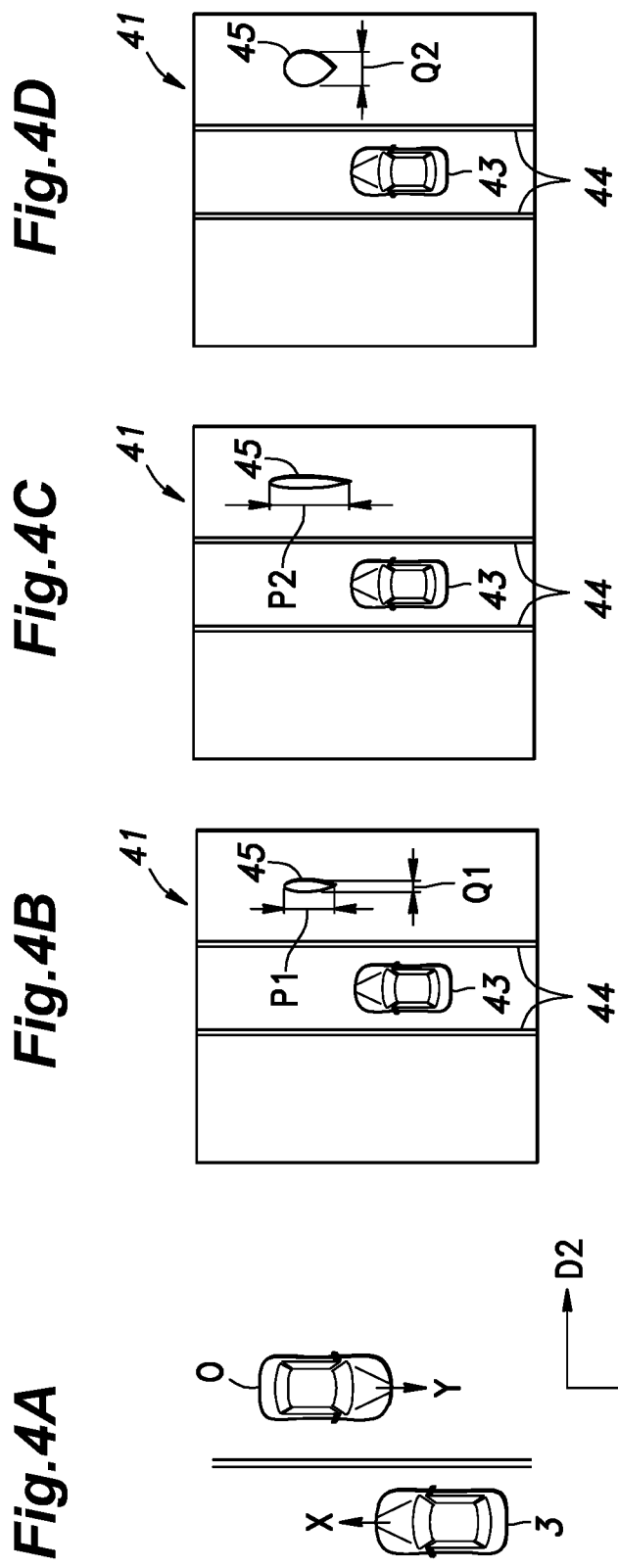

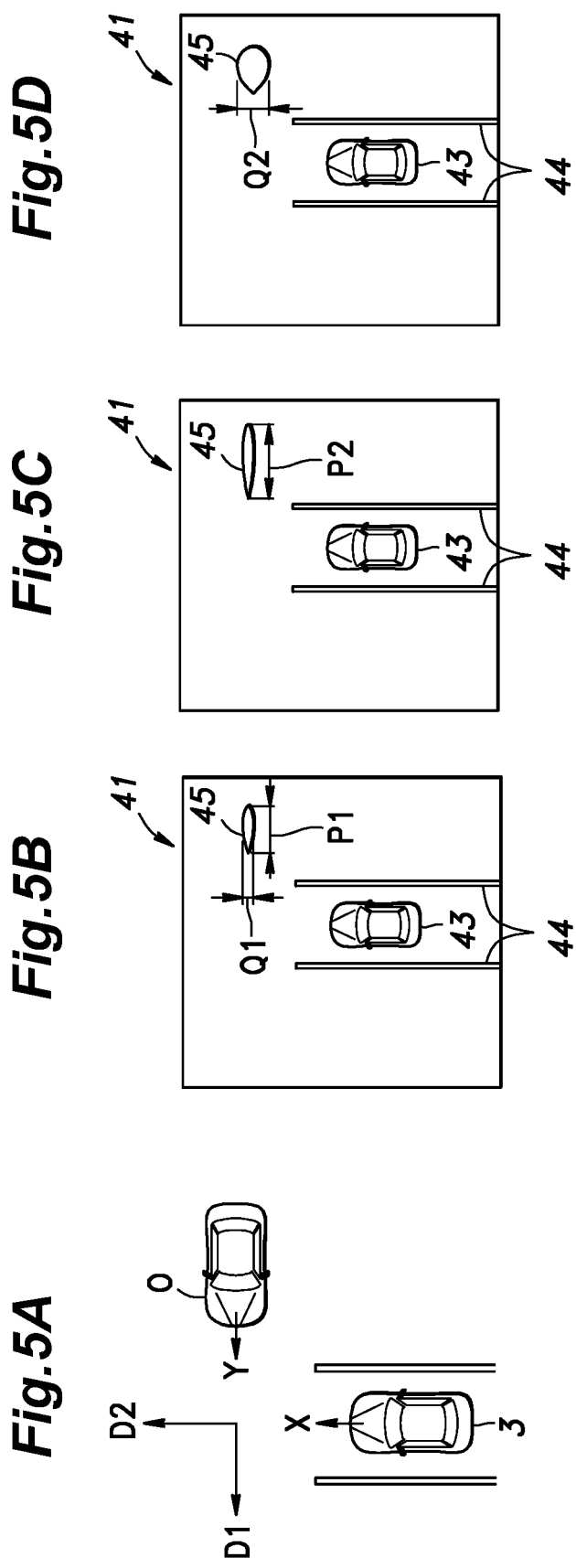

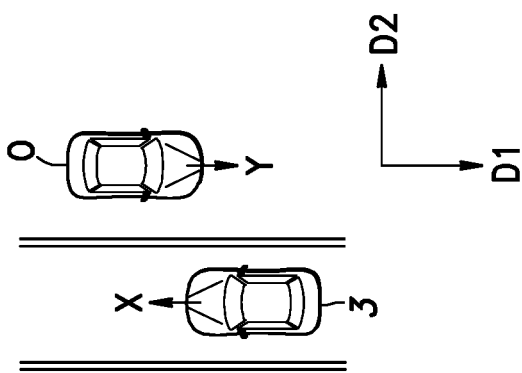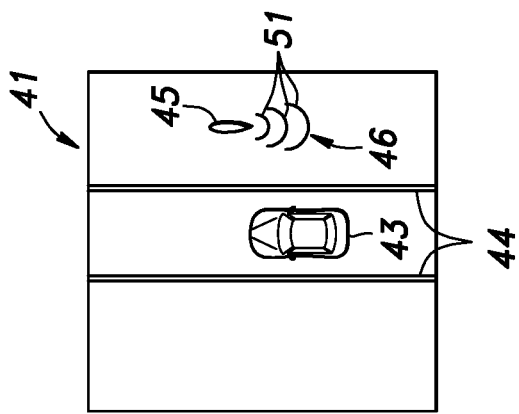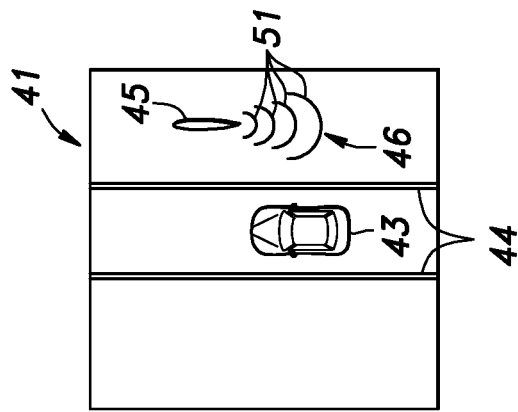

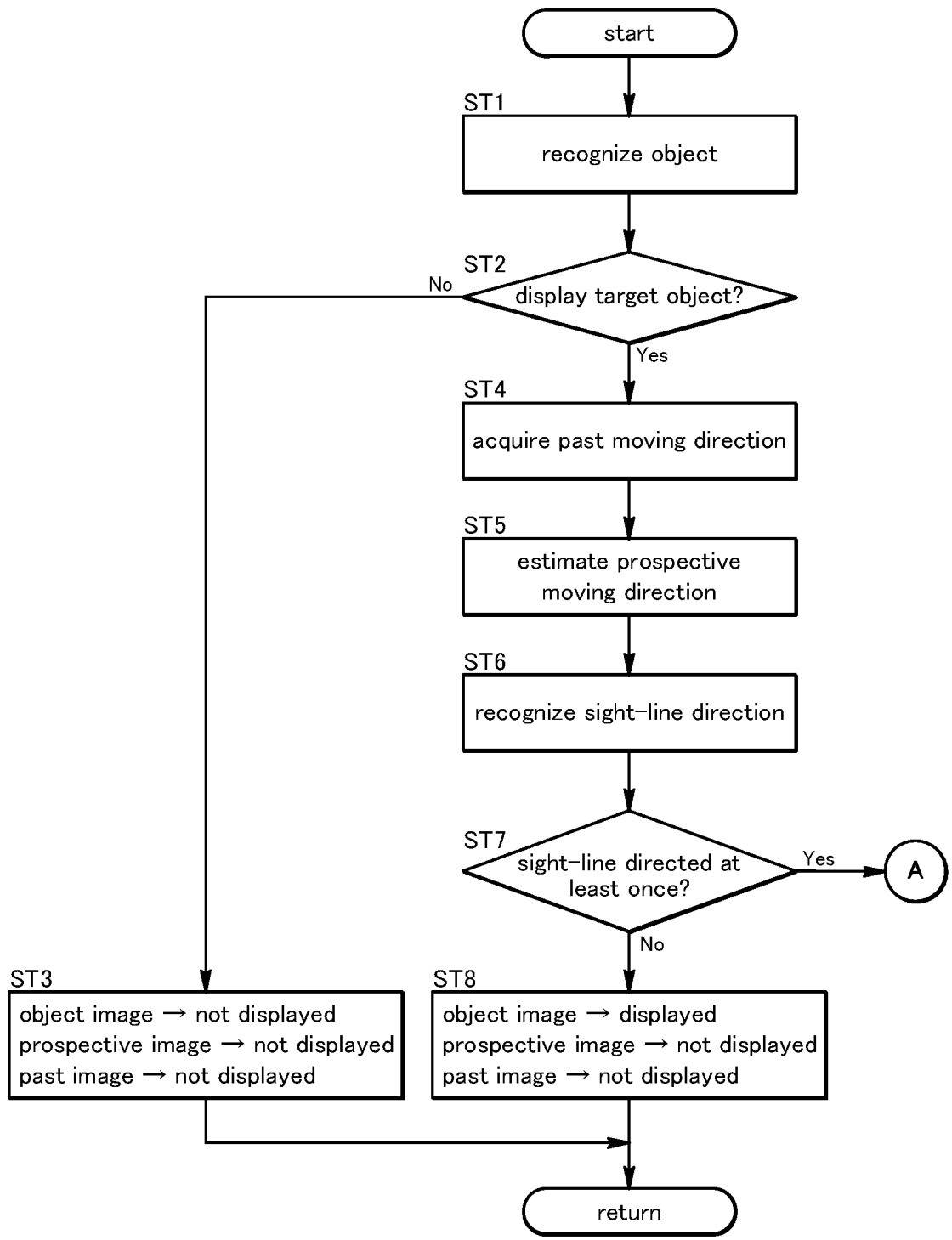

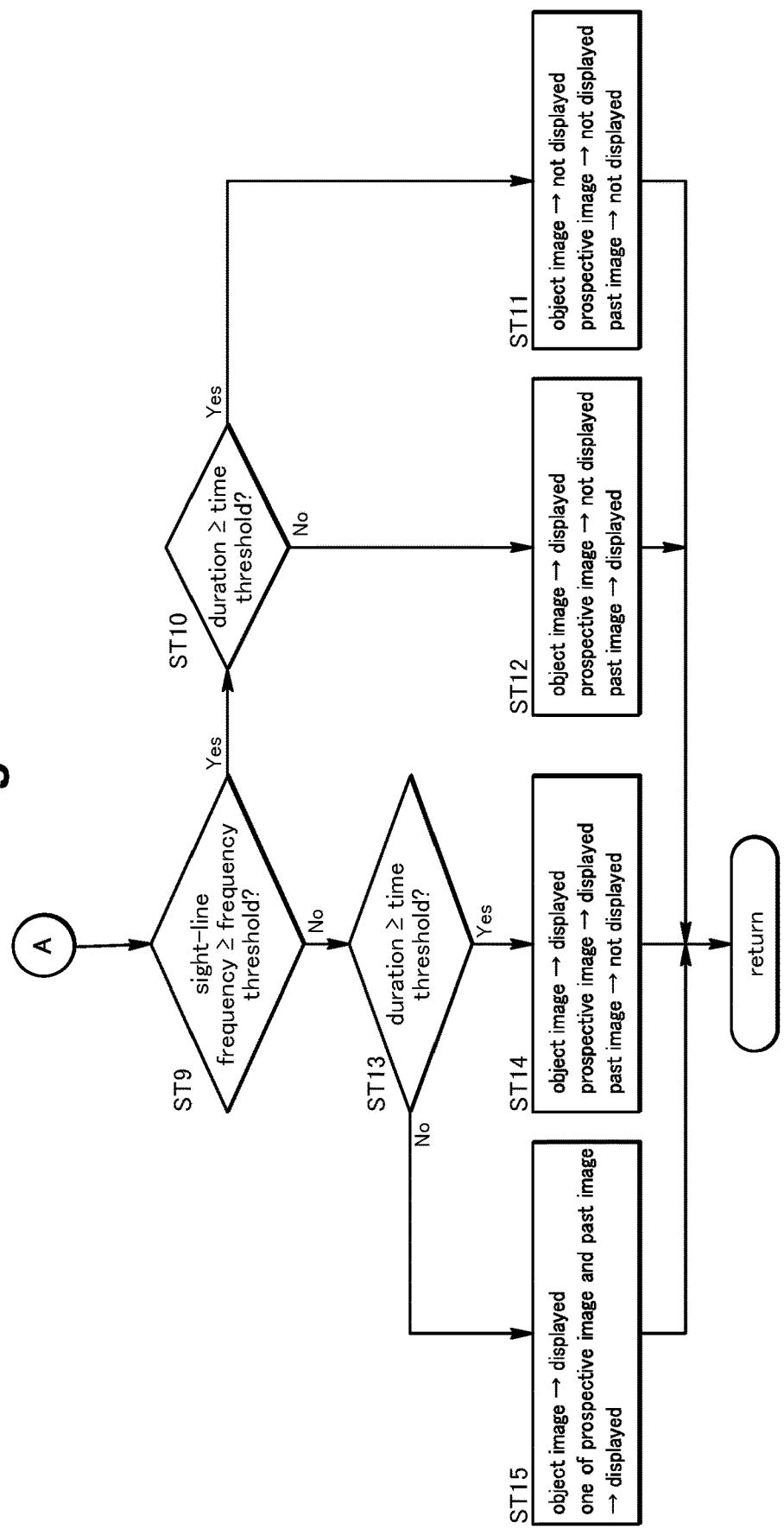

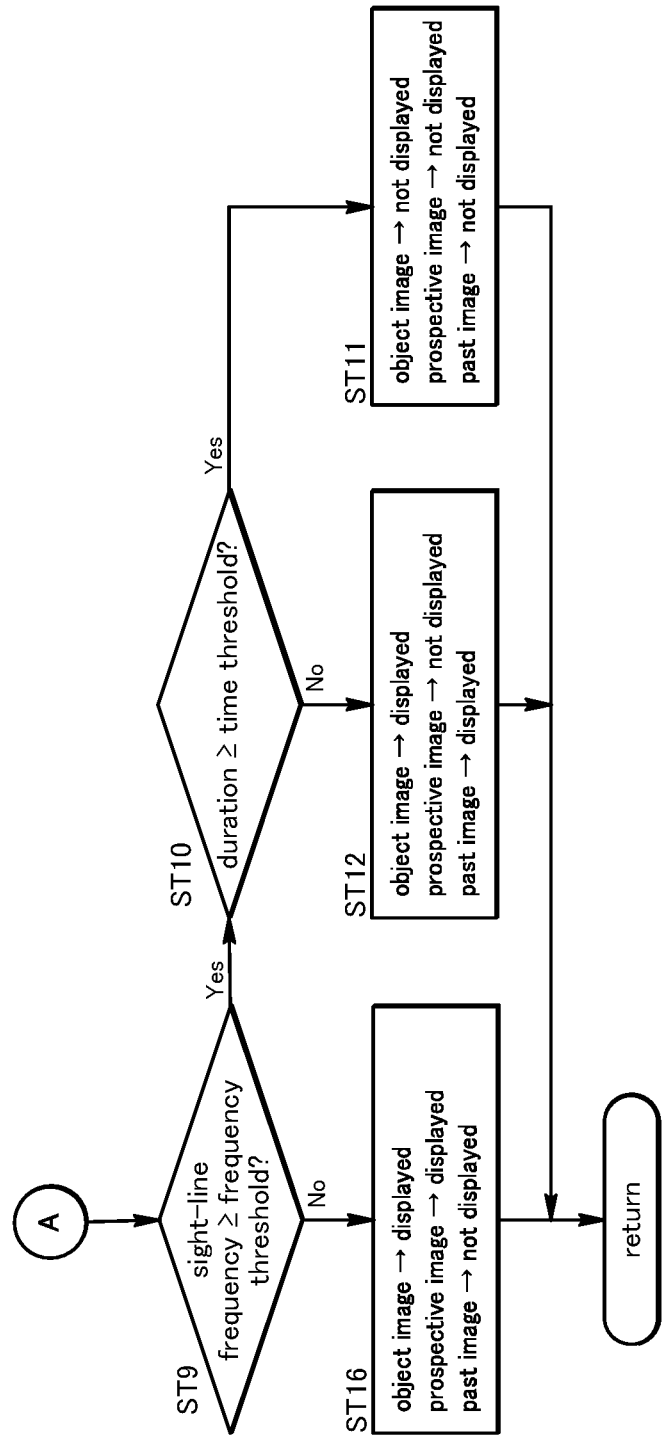

Fig.10

| type of recognition error | example | criteria | HUD |
|---|---|---|---|
| first type | optimistic driving | sight-line frequency < frequency threshold | object image and prospective image |
| second type | incorrect estimation | duration < time threshold | object image and past image |
| third type | overlook | sight-line never directed to object | object image |

# INFORMATION DISPLAY DEVICE

TECHNICAL FIELD

The present invention relates to an information display device.

BACKGROUND ART

Conventionally, a known information display device displays information about an object (for example, another vehicle, a two-wheeled vehicle, a pedestrian) such that the information about the object at least partially overlaps with the forward view of a user.

For example, JP2021-117704A discloses a display device that displays a virtual image of a presented image such that the virtual image at least partially overlaps with the front scenery of a mobile body.

If the sight-line of the user is not directed to the object frequently, the user may not sufficiently estimate a prospective moving direction of the object. In such a case, it is preferable to support the user's estimation of the prospective moving direction of the object by performing appropriate display on the information display device. However, the above conventional technique does not consider the frequency with which the sight-line of the user is directed to the object, which makes it difficult to assist the user in estimating the prospective moving direction of the object according to the frequency with which the sight-line of the user is directed to the object.

SUMMARY OF THE INVENTION

In view of the above background, an object of the present invention is to provide an information display device that can assist a user in estimating a prospective moving direction of an object according to the frequency with which a sight-line of the user is directed to the object.

To achieve such an object, one aspect of the present invention provides an information display device (1), comprising: an object information acquiring unit (4, 14) configured to acquire at least position information about an object (O) present around a mobile body (3); a sight-line information acquiring unit (15) configured to acquire information about a sight-line of a user of the mobile body; a display unit (16) configured to display information about the object such that the information about the object at least partially overlaps with forward view of the user; and a controller (17) configured to control display of the display unit, wherein the controller is configured to estimate or acquire a prospective moving direction of the object based on an acquisition result of the object information acquiring unit (step ST5), acquire a sight-line frequency based on the acquisition result of the object information acquiring unit and an acquisition result of the sight-line information acquiring unit, the sight-line frequency representing a frequency with which the sight-line of the user is directed to the object within a prescribed period, determine whether the sight-line frequency is equal to or more than a prescribed frequency threshold (step ST9), and cause the display unit to display the prospective moving direction of the object (step ST14, ST16) at least on condition that the controller determines that the sight-line frequency is less than the frequency threshold (step ST9: No).

According to this aspect, it is possible to assist the user in estimating the prospective moving direction of the object according to the sight-line frequency.

In the above aspect, preferably, the controller is configured to determine whether the sight-line of the user has been directed to the object at least once within the prescribed period (step ST7), and cause the display unit to display the prospective moving direction of the object (step ST14, ST16) at least on condition that the controller determines that the sight-line of the user has been directed to the object at least once within the prescribed period (step ST7: Yes) and that the sight-line frequency is less than the frequency threshold (step ST9: No).

According to this aspect, it is possible to cause the display unit to display the prospective moving direction of the object after confirming that the sight-line of the user has been directed to the object at least once within the prescribed period. Accordingly, the user can easily recognize that the prospective moving direction of the object is displayed.

In the above aspect, preferably, the controller is configured to acquire a past moving direction of the object based on the acquisition result of the object information acquiring unit (step ST4), acquire duration based on the acquisition result of the object information acquiring unit and the acquisition result of the sight-line information acquiring unit, the duration representing a period during which the sight-line of the user is continuously directed to the object within the prescribed period, determine whether the duration is equal to or more than a prescribed time threshold (step ST10), and cause the display unit to display the past moving direction of the object (step ST12) at least on condition that the controller determines that the duration is less than the time threshold (step ST10: No).

According to this aspect, it is possible to assist the user in recognizing the past moving direction of the object according to the duration.

In the above aspect, preferably, the controller is configured to cause the display unit to display a prospective image (46) and a past image (47) differently from each other, the prospective image indicating the prospective moving direction of the object, the past image indicating the past moving direction of the object.

According to this aspect, a user can easily distinguish between the prospective moving direction of the object and the past moving direction of the object.

In the above aspect, preferably, the prospective image and the past image each include a plurality of pattern images (51, 52) arranged at an interval, and the controller is configured to change the number of the pattern images based on a moving speed of the object.

According to this aspect, the user can recognize, based on the prospective image or the past image, not only the prospective or past moving direction of the object but also the moving speed of the object.

In the above aspect, preferably, the mobile body is a vehicle, the user is a driver of the vehicle, the information display device further comprises an operation information acquiring unit (13) configured to acquire information about a driving operation of the vehicle performed by the driver, and in a case where the driving operation is started when the sight-line of the user is not directed to the object and the driving operation whose changing amount is equal to or less than a prescribed value continues even after the sight-line of the user is directed to the object, the controller sets the time threshold shorter as compared with a case where the changing amount exceeds the prescribed value after the sight-line of the user is directed to the object or a case where the driving operation is stopped after the sight-line of the user is directed to the object.

In a case where the driving operation whose changing amount is equal to or less than the prescribed value continues even after the sight-line of the user is directed to the object, it is estimated that the user is looking at the object. In such a case, the time threshold is set short to prevent the past moving direction of the object from being displayed even though the user is looking at the object. Accordingly, the user is less likely to feel annoyed by the display of the past moving direction of the object.

In the above aspect, preferably, the controller is configured to estimate the prospective moving direction of the object based on at least one of a type of the object, a position of the object, a moving speed of the object, a past moving direction of the object, and a surrounding environment of the object.

According to this aspect, it is possible to accurately estimate the prospective moving direction of the object.

In the above aspect, preferably, the mobile body is a vehicle, the user is a driver of the vehicle, the information display device further comprises an operation information acquiring unit (13) configured to acquire information about a driving operation of the vehicle performed by the driver, and in a case where the driving operation is started when the sight-line of the user is not directed to the object and the driving operation whose changing amount is equal to or less than a prescribed value continues even after the sight-line of the user is directed to the object, the controller sets the frequency threshold lower as compared with a case where the changing amount exceeds the prescribed value after the sight-line of the user is directed to the object or a case where the driving operation is stopped after the sight-line of the user is directed to the object.

In a case where the driving operation whose changing amount is equal to or less than the prescribed value continues even after the sight-line of the user is directed to the object, it is estimated that the user is looking at the object. In such a case, the frequency threshold is set low to prevent the prospective moving direction of the object from being displayed even though the user is looking at the object. Accordingly, the user is less likely to feel annoyed by the display of the prospective moving direction of the object.

In the above aspect, preferably, the controller is configured to cause the display unit to display an object image (45) that indicates a relative position of the object with respect to the mobile body, and the object image is composed of a graphic image.

According to this aspect, it is possible to show the relative position of the object with respect to the mobile body by using a simple image. Accordingly, the user can easily recognize the relative position of the object with respect to the mobile body.

In the above aspect, preferably, provided that a direction parallel to a moving direction of the object in a plan view is defined as a first direction, the controller is configured to increase a length of the object image in the first direction as a component in the first direction of a relative speed of the object with respect to the mobile body increases.

According to this aspect, the user can recognize, based on the object image, not only the relative position of the object with respect to the mobile body but also the relative speed of the object with respect to the mobile body.

In the above aspect, provided that a direction perpendicular to the moving direction of the object in the plan view is defined as a second direction, the controller is configured to increase a length of the object image in the second direction as a changing amount of the relative position of the object in the second direction with respect to the mobile body increases.

According to this aspect, the user can recognize, based on the object image, not only the relative position and the relative speed of the object with respect to the mobile body but also the changing amount of the relative position of the object with respect to the mobile body (a moving degree of the object with respect to the mobile body).

In the above aspect, preferably, the controller is configured to acquire a past moving direction of the object based on the acquisition result of the object information acquiring unit (step ST4), determine whether the sight-line of the user has been directed to the object at least once within the prescribed period (step ST7), and cause the display unit to display the object image without causing the display unit to display at least one of the prospective moving direction of the object and the past moving direction of the object (step ST8) upon determining that the sight-line of the user has never been directed to the object within the prescribed period (step ST7: No).

According to the above aspect, when the user is unaware of the object, the user can be notified of the relative position of the object with respect to the mobile body by a simple display. Accordingly, even when the object is present not in a central vision (an area the user is looking at) of the user but in a circumferential vision (an area around the central vision) of the user, it becomes easier for the user to intuitively recognize the relative position of the object with respect to the mobile body.

In the above aspect, preferably, the controller is configured to determine whether a distance from the mobile body to the object is equal to or more than a prescribed distance threshold, and change a color of an image relating to the object upon determining that the distance from the mobile body to the object is less than the distance threshold.

According to this aspect, the user can recognize, based on the image relating to the object, that the object has approached the mobile body.

In the above aspect, preferably, the mobile body is a vehicle, the user is a driver of the vehicle, and the controller is configured to execute travel control of the vehicle, and change a color of an image relating to the object in a case where the object is set as a target of the travel control.

According to this aspect, the user can recognize, based on the image relating to the object, that the object is set as the target of the travel control.

Thus, according to the above aspects, it is possible to assist a user in estimating a prospective moving direction of an object according to the frequency with which a sight-line of the user is directed to the object.

BRIEF DESCRIPTION OF THE DRAWING(S)

FIG. 4A is a plan view showing a state where a vehicle and an object are moving in opposite directions;

FIGS. 4B to 4D are explanatory diagrams showing examples of the surrounding image in the state of FIG. 4A;

FIG. 5A is a plan view showing a state where the vehicle and the object are moving in directions perpendicular to each other;

FIGS. 5B to 5D are explanatory diagrams showing examples of the surrounding image in the state of FIG. 5A;

FIG. 6A is a plan view showing a state where the vehicle and the object are moving in opposite directions;

FIGS. 6B and 6C are explanatory diagrams showing examples of the surrounding image in the state of FIG. 6A;

FIG. 7 is a flowchart showing the first half of the display contents setting control;

FIG. 8 is a flowchart showing the second half of the display contents setting control;

FIG. 9 is a flowchart showing a modified embodiment of the second half of the display contents setting control; and FIG. 10 is a table showing the type of a recognition error of the object by a driver.

DETAILED DESCRIPTION OF THE INVENTION

<The Information Display Device 1>

Figure 1:
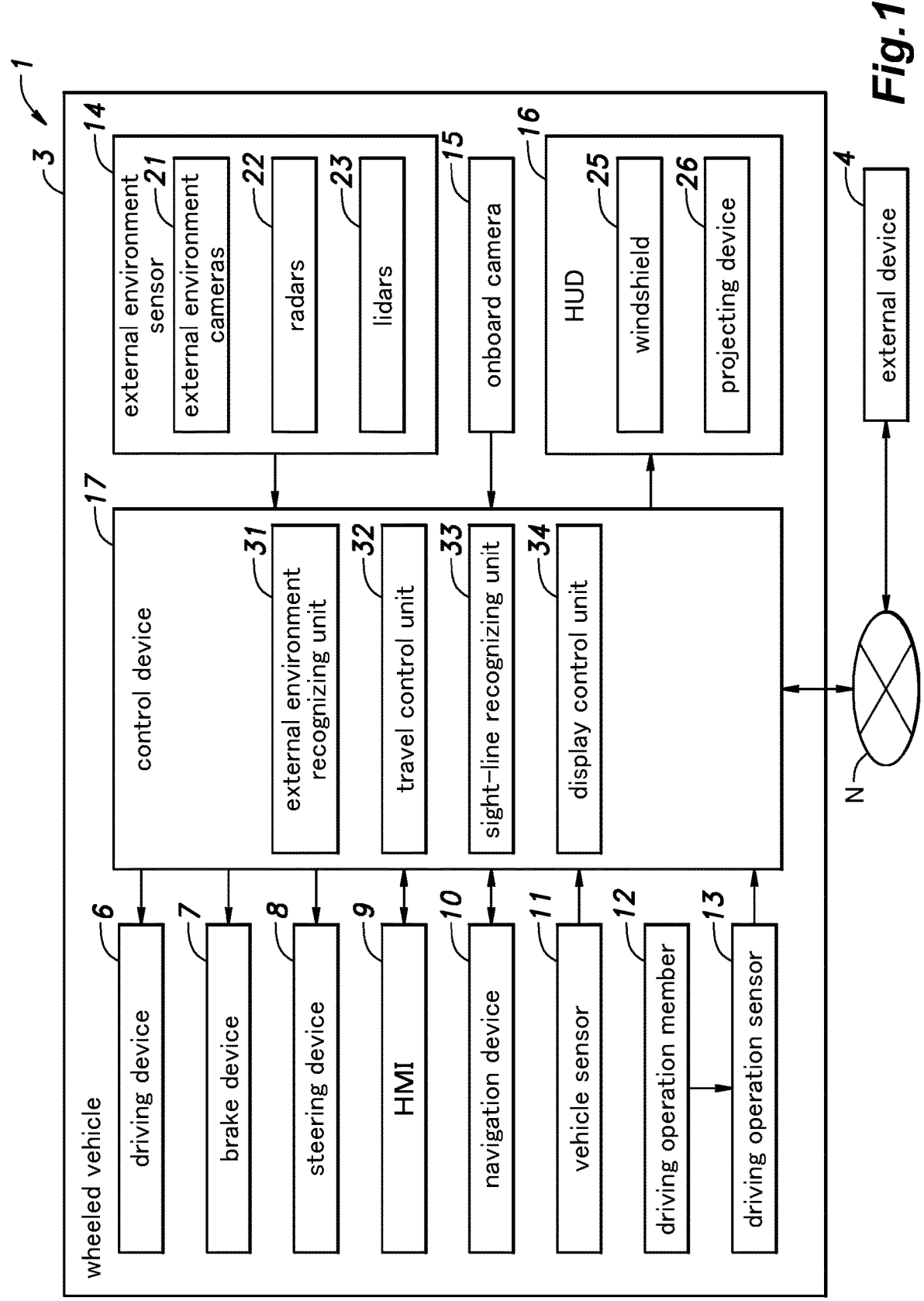
FIG. 1 is a functional block diagram showing an information display device according to one embodiment of the present invention.

First, with reference to FIG. 1, the configuration of the information display device 1 according to one embodiment of the present invention will be described. The information display device 1 includes a wheeled vehicle 3 (i.e., an own wheeled vehicle: an example of a mobile body and a vehicle) and an external device 4 provided outside the wheeled vehicle 3.

<The Wheeled Vehicle 3>

The wheeled vehicle 3 is, for example, a four-wheeled automobile. The wheeled vehicle 3 includes a driving device 6, a brake device 7, a steering device 8, a human machine interface 9 (HMI), a navigation device 10, a vehicle sensor 11, a driving operation member 12, a driving operation sensor 13 (an example of an operation information acquiring unit), an external environment sensor 14 (an example of an object information acquiring unit), an onboard camera 15 (an example of a sight-line information acquiring unit), a head up display 16 (HUD: an example of a display unit), and a control device 17 (an example of a controller).

The driving device 6 is a device that applies driving force to the wheeled vehicle 3. For example, the driving device 6 includes an internal combustion engine such as a gasoline engine or a diesel engine and/or an electric motor.

The brake device 7 is a device that applies a braking force to the wheeled vehicle 3. For example, the brake device 7 includes a brake caliper that presses a pad against a brake rotor and an electric cylinder that supplies hydraulic pressure to the brake caliper.

The steering device 8 is a device that changes a steering angle of wheels. For example, the steering device 8 includes a rack and pinion mechanism that steers the wheels and an electric motor that drives the rack and pinion mechanism.

The HMI 9 is a device that displays information to a driver (an example of a user) and receives information input by the driver. The HMI 9 is installed inside the wheeled vehicle 3 (for example, installed on a dashboard). HMI 9 includes a touch panel with a display screen.

The navigation device 10 is a device that guides the wheeled vehicle 3 to the destination thereof. The navigation device 10 stores map information. The navigation device 10 identifies a current position (latitude and longitude) of the wheeled vehicle 3 based on GNSS signals received from artificial satellites (positioning satellites). The navigation device 10 sets a route to the destination of the wheeled vehicle 3 based on the map information, the current position of the wheeled vehicle 3, and the destination of the wheeled vehicle 3 input to the HMI 9 by the driver.

The vehicle sensor 11 is a sensor that detects various states of the wheeled vehicle 3. For example, the vehicle sensor 11 may include a vehicle speed sensor that detects the speed of the wheeled vehicle 3, an acceleration sensor that detects the acceleration of the wheeled vehicle 3, a yaw rate sensor that detects the angular velocity of the wheeled vehicle 3 around the vertical axis, a direction sensor that detects the direction of the wheeled vehicle 3, or the like. The vehicle sensor 11 outputs the detection result to the control device 17.

The driving operation member 12 is a device that receives a driving operation of the wheeled vehicle 3 by the driver. The driving operation member 12 includes a steering wheel that receives a steering operation by the driver, an accelerator pedal that receives an acceleration operation by the driver, and a brake pedal that receives a deceleration operation by the driver.

The driving operation sensor 13 is a sensor that detects an operation amount of the driving operation on the driving operation member 12. In other words, the driving operation sensor 13 is a sensor that acquires information about the driving operation on the driving operation member 12. The driving operation sensor 13 includes a steering angle sensor that detects a rotation angle of the steering wheel, an accelerator sensor that detects a pressing amount of the accelerator pedal, and a brake sensor that detects a pressing amount of the brake pedal. The driving operation sensor 13 outputs the detection result to the control device 17.

The external environment sensor 14 is a sensor that detects a state of an external environment of the wheeled vehicle 3. For example, the external environment sensor 14 detects a relative position of at least one object O present around the wheeled vehicle 3 with respect to the wheeled vehicle 3. In other words, the external environment sensor 14 acquires position information about the object O. The object O may be another vehicle such as a preceding vehicle, a pedestrian, a bicycle, an obstacle, and the like. The external environment sensor 14 outputs the detection result to the control device 17.

The external environment sensor 14 includes a plurality of external environment cameras 21, a plurality of radars 22, and a plurality of lidars 23 (LiDAR). Each external environment camera 21 captures an image of the object O present around the wheeled vehicle 3. Each radar 22 emits radio waves such as millimeter waves around the wheeled vehicle 3 and captures the reflected waves thereof, thereby detecting the relative position of the object O present around the wheeled vehicle 3 with respect to the wheeled vehicle 3. Each lidar 23 irradiates light such as infrared rays to the surroundings of the wheeled vehicle 3 and captures the reflected light thereof, thereby detecting the relative position of the object O present around the wheeled vehicle 3 with respect to the wheeled vehicle 3.

The onboard camera 15 is a device that captures an image of the driver's face. In other words, the onboard camera 15 is a device that acquires information about a sight-line of the driver. The onboard camera 15 is installed inside the wheeled vehicle 3 (for example, installed in front of the steering wheel). The onboard camera 15 outputs the imaging result to the control device 17.

The HUD 16 is a device that displays information about the object O such that the entirety of the information about the object O overlaps with forward view (forward scenery) of the driver. In another embodiment, the HUD 16 may display the information about the object O such that only a portion of the information about the object O overlaps with the forward view of the driver.

The HUD 16 includes a windshield 25 that partitions an inside space of the wheeled vehicle 3 and an outside space in front of the wheeled vehicle 3 and a projecting device 26 (projector) that projects the information about the object O onto a prescribed portion (for example, a portion right in front of the driver) of the windshield 25. The windshield 25 is made of a transparent material such as glass or transparent resin. Accordingly, the driver can visually recognize the outside space in front of the wheeled vehicle 3 through the windshield 25. The projecting device 26 includes a light source and a plurality of mirrors that reflect light emitted from the light source.

The control device 17 is an electronic control device (ECU) consisting of a computer configured to execute various processes. The control device 17 includes an arithmetic processing unit (a processor such as a CPU and an MPU) and a storage device (memory such as ROM and RAM). The arithmetic processing unit reads out necessary software from the storage device and executes prescribed arithmetic processing according to the software that has been read out. The control device 17 may be composed of one piece of hardware, or may be composed of a unit including plural pieces of hardware. The control device 17 is connected to each component of the wheeled vehicle 3 via a communication network such as a controller area network (CAN), and controls each component of the wheeled vehicle 3.

The control device 17 includes, as functional units, an external environment recognizing unit 31, a travel control unit 32, a sight-line recognizing unit 33, and a display control unit 34. At least a portion of each functional unit of the control device 17 may be realized by hardware such as LSI, ASIC, FPGA, or the like, or may be realized by a combination of software and hardware.

The external environment recognizing unit 31 recognizes the state of the external environment of the wheeled vehicle 3 based on the detection result of the external environment sensor 14. For example, the external environment recognizing unit 31 recognizes, based on the detection result of the external environment sensor 14, the object O present around the wheeled vehicle 3, the relative position of the object O with respect to the wheeled vehicle 3, the relative speed of the object O with respect to the wheeled vehicle 3, the distance from the wheeled vehicle 3 to the object O, or the like.

The external environment recognizing unit 31 acquires, based on the detection result of the external environment sensor 14, the type of the object O, the position (absolute position) of the object O, the moving speed of the object O, the past moving direction of the object O, and the surrounding environment of the object O. The external environment recognizing unit 31 may acquire these pieces of information based on not only the detection result of the external environment sensor 14 but also the detection result of the vehicle sensor 11 and the GNSS signals. The type of the object O may include another vehicle such as a preceding vehicle, a pedestrian, a bicycle, and the like. The surrounding environment of the object O may include a road shape, a road width, or the like around the object O. When the object O is a pedestrian, the surrounding environment of the object O may include another pedestrian on the opposite side of the pedestrian across a road. When the object O is a preceding vehicle, the surrounding environment of the object O may include a traffic signal in front of the preceding vehicle and a vehicle in front of the preceding vehicle.

The external environment recognizing unit 31 estimates a prospective moving direction of the object O based on at least one of the type of the object O, the position of the object O, the moving speed of the object O, the past moving direction of the object O, and the surrounding environment of the object O. Accordingly, the external environment recognizing unit 31 can accurately estimate the prospective moving direction of the object O. For example, the external environment recognizing unit 31 calculates a probability distribution (Gaussian distribution), which defines the direction around the object O as a random variable, based on the type of the object O, the position of the object O, the moving speed of the object O, the past moving direction of the object O, and the surrounding environment of the object O. After that, the external environment recognizing unit 31 may estimate the direction with the highest probability density in the above probability distribution as the prospective moving direction of the object O.

The travel control unit 32 executes travel control of the wheeled vehicle 3 based on the state of the external environment of the wheeled vehicle 3 recognized by the external environment recognizing unit 31. For example, the travel control unit 32 executes acceleration and deceleration control and steering control of the wheeled vehicle 3 based on the relative position of the object O with respect to the wheeled vehicle 3 recognized by the external environment recognizing unit 31.

The travel control unit 32 executes preceding vehicle following control such as adaptive cruise control (ACC) as the acceleration and deceleration control of the wheeled vehicle 3. In the preceding vehicle following control, the travel control unit 32 controls the driving device 6 and the brake device 7 such that the following distance between the wheeled vehicle 3 and the preceding vehicle thereof is maintained within a prescribed range.

The travel control unit 32 executes lane keeping control such as a lane keeping assist system (LKAS) as the steering control of the wheeled vehicle 3. In the lane keeping control, the travel control unit 32 controls the steering device 8 such that the wheeled vehicle 3 travels at a reference position within the lane (for example, the substantial center of the lane in the width direction) defined by delimiting lines D.

The sight-line recognizing unit 33 recognizes the sight-line direction of the driver based on the imaging result of each onboard camera 15. For example, the sight-line recognizing unit 33 extracts the positions of the driver's pupils from the image of the driver's face captured by the onboard camera 15, thereby recognizing the sight-line direction of the driver based on the positions of the driver's pupils.

The display control unit 34 controls the display of the HUD 16. More specifically, the display control unit 34 switches images displayed on the HUD 16 based on the recognition result of the external environment recognizing unit 31, the executing state of the travel control by the travel control unit 32, the recognition result of the sight-line recognizing unit 33, and the like.

Hereinafter, for convenience of explanation, the functional units of the control device 17 will be simply described as "the control device 17" without distinguishing the same.

<The External Device 4>

For example, the external device 4 consists of a control device of another vehicle, a communication device for intelligent transport systems (ITS), a map server storing a high-precision map, or the like. The external device 4 consists of a computer including an arithmetic processing unit (a processor such as a CPU and an MPU) and a storage device (memory such as ROM and RAM). The external device 4 is connected to the control device 17 of the wheeled vehicle 3 via a wireless network N such as the Internet so as to communicate wirelessly with the control device 17 of the wheeled vehicle 3.

The external device 4 acquires information (hereinafter referred to as "the object information") about the object O present around the wheeled vehicle 3. The object information preferably includes information about the past moving direction of the object O, information about the prospective moving direction of the object O, or the like. The external device 4 transmits the acquired object information to the control device 17 of the wheeled vehicle 3.

<The Surrounding Image 41>

Next, a surrounding image 41 displayed on the HUD 16 by the control device 17 will be described with reference to FIGS. 2 and 3.

The surrounding image 41 is displayed on the prescribed portion (for example, the portion right in front of the driver) of the windshield 25 regardless of the spatial positions of the wheeled vehicle 3 and the object O around the wheeled vehicle 3. For example, the surrounding image 41 is an image in a plan view looking down on the wheeled vehicle 3 and the surrounding area thereof from right above. In another embodiment, the surrounding image 41 may be an image (a three-dimensional image) in a bird's-eye view looking down on the wheeled vehicle 3 and the surrounding area thereof from diagonally behind, or may be an image in a view other than a plan view or a bird's eye view.

The surrounding image 41 includes an own vehicle image 43 and one or more delimiting line images 44. Furthermore, the surrounding image 41 includes one or more object images 45 and at least one prospective image 46 and/or at least one past image 47 when prescribed conditions described later are satisfied.

The own vehicle image 43 consists of a graphic image showing the position of the wheeled vehicle 3 (i.e., the own wheeled vehicle). The own vehicle image 43 is preferably displayed in the substantial center of the surrounding image 41. For example, the own vehicle image 43 consists of an icon that imitates the shape of the wheeled vehicle 3.

Each delimiting line image 44 consists of a graphic image indicating the position of the corresponding delimiting line D around the wheeled vehicle 3. For example, the delimiting line image 44 consists of a straight or curved line of the prescribed thickness. In another embodiment, the display of the delimiting line image 44 may be omitted.

Figure 2:
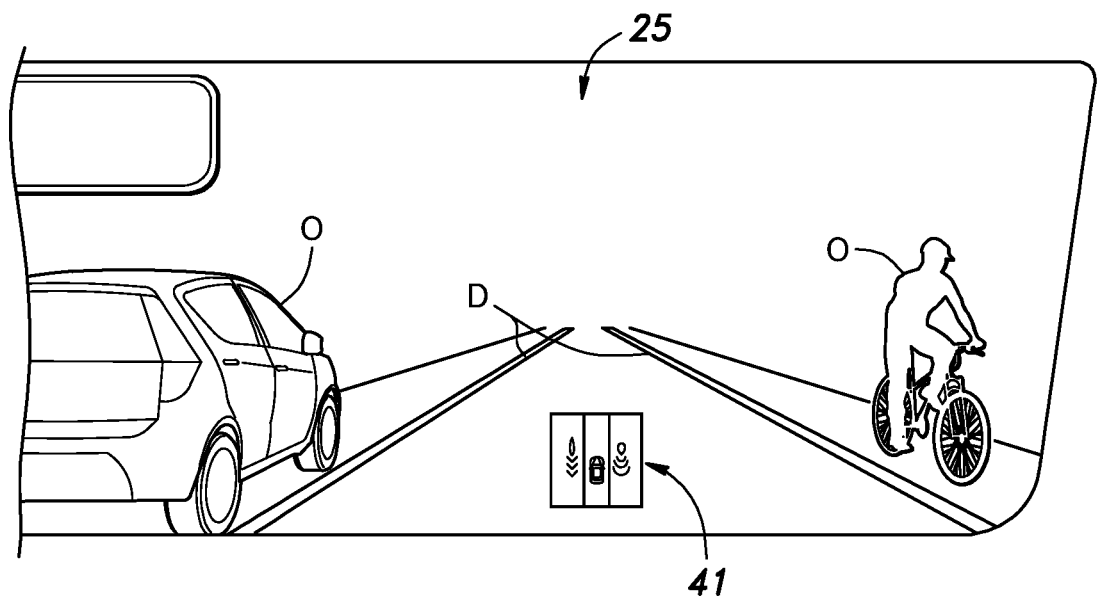
FIG. 2 is a rear view showing a windshield on which a surrounding image (surrounding monitoring image) is shown.
Figure 3:
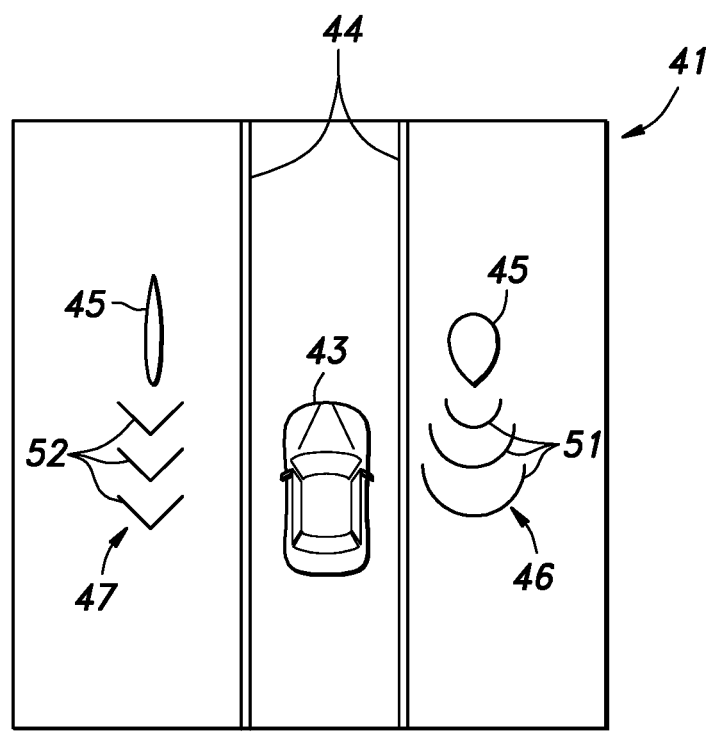
FIG. 3 is an explanatory diagram showing the surrounding image.

Each object image 45 is a graphic image indicating the position of the object O present around the wheeled vehicle 3 (in FIG. 2, another vehicle present on the left side of the wheeled vehicle 3 or a bicycle present on the right side of the wheeled vehicle 3). By using the graphic image as the object image 45 in this way, the relative position of the object O with respect to the wheeled vehicle 3 can be displayed with a simple image. Accordingly, the driver can easily recognize the relative position of the object O with respect to the wheeled vehicle 3. The object image 45 consists of an icon with a prescribed shape (for example, a teardrop-like shape sharpened on a tip side (front side) in the moving direction the object O) regardless of an actual shape of the object O.

The prospective image 46 is an image indicating the prospective moving direction of the object O. The prospective image 46 consists of a plurality of pattern images 51 arranged at intervals. The pattern images 51 are aligned along the prospective moving direction of the object O. For example, each pattern image 51 has an arc shape.

The past image 47 is an image indicating the past moving direction of the object O. The past image 47 consists of a plurality of pattern images 52 arranged at intervals. The pattern images 52 are aligned along the past moving direction of the object O. For example, each pattern image 52 has a V shape.

In this way, the prospective image 46 and the past image 47 are displayed differently from each other. Accordingly, the driver can easily distinguish between the prospective image 46 and the past image 47. In another embodiment, the prospective image 46 and the past image 47 may be displayed with different line types, colors, sizes, and the like. That is, the prospective image 46 and the past image 47 may be displayed in any mode as long as they are displayed differently from each other.

<The Deformation of the Object Image 45>

Next, the deformation of the object image 45 will be described with reference to FIGS. 4A to 4D and FIGS. 5A to 5D.

An arrow X in each of FIGS. 4A and 5A indicates the prospective moving direction of the wheeled vehicle 3, and an arrow Y in each of FIGS. 4A and 5A indicates the prospective moving direction of the object O (another vehicle in FIGS. 4A and 5A). An arrow D1 in each of FIGS. 4A and 5A indicates the direction (hereinafter referred to as "the first direction") parallel to the prospective moving direction of the object O in a plan view, and an arrow D2 in each of FIGS. 4A and 5A indicates the direction (hereinafter referred to as "the second direction") perpendicular to the prospective moving direction of the object O in a plan view. Hereinafter, "the relative speed of the object O" will indicate the relative speed of the object O with respect to the wheeled vehicle 3, and "the relative position of the object O" will indicate the relative position of the object O with respect to the wheeled vehicle 3.

FIG. 4A shows a state where the wheeled vehicle 3 and the object O are moving in opposite directions. In this state, if the component (that matches the sum of the moving speed of the object O and the moving speed of the wheeled vehicle 3 in this state) in the first direction of the relative speed of the object O is V1, the control device 17 sets the length of the object image 45 in the first direction to P1 (see FIG. 4B). On the other hand, when the component in the first direction of the relative speed of the object O increases from V1 to V2, the control device 17 expands the object image 45 in the first direction, thereby increasing the length of the object image 45 in the first direction from P1 to P2 (see FIG. 4C). By contrast, when the component in the first direction of the relative speed of the object O decreases from V2 to V1, the control device 17 shrinks the object image 45 in the first direction, thereby reducing the length of the object image 45 in the first direction from P2 to P1 (see FIG. 4B).

Further, in the state of FIG. 4A, if dispersion of the relative position of the object O in the second direction (i.e., an average of the square of deviation of the relative position of the object O in the second direction from an average of the relative position of the object O in the second direction) within a prescribed period is A1, the control device 17 sets the length of the object image 45 in the second direction to Q1 (see FIG. 4B). The dispersion of the relative position of the object O in the second direction is an example of the changing amount of the relative position of the object O in the second direction within the prescribed period. On the other hand, when the dispersion of the relative position of the object O in the second direction increases from A1 to A2, the control device 17 expands the object image 45 in the second direction, thereby increasing the length of the object image 45 in the second direction from Q1 to Q2 (see FIG. 4D). By contrast, when the dispersion of the relative position of the object O in the second direction decreases from A2 to A1, the control device 17 shrinks the object image 45 in the second direction, thereby reducing the length of the object image 45 in the second direction from Q2 to Q1 (see FIG. 4B).

FIG. 5A shows a state where the wheeled vehicle 3 and the object O are moving in directions perpendicular to each other. In this state, if the component (that matches the moving speed of the object O in this state) in the first direction of the relative speed of the object O is V1, the control device 17 sets the length of the object image 45 in the first direction to P1 (see FIG. 5B). On the other hand, when the component in the first direction of the relative speed of the object O increases from V1 to V2, the control device 17 expands the object image 45 in the first direction, thereby increasing the length of the object image 45 in the first direction from P1 to P2 (see FIG. 5C). By contrast, when the component in the first direction of the relative speed of the object O decreases from V2 to V1, the control device 17 shrinks the object image 45 in the first direction, thereby reducing the length of the object image 45 in the first direction from P2 to P1 (see FIG. 5B).

In the state of FIG. 5A, if the dispersion of the relative position of the object O in the second direction is A1, the control device 17 sets the length of the object image 45 in the second direction to Q1 (see FIG. 5B). On the other hand, when the dispersion of the relative position of the object O in the second direction increases from A1 to A2, the control device 17 expands the object image 45 in the second direction, thereby increasing the length of the object image 45 in the second direction from Q1 to Q2 (see FIG. 5D). By contrast, when the dispersion of the relative position of the object O in the second direction decreases from A2 to A1, the control device 17 shrinks the object image 45 in the second direction, thereby reducing the length of the object image 45 in the second direction from Q2 to Q1 (see FIG. 5B).

As described above, the control device 17 increases the length of the object image 45 in the first direction as the component in the first direction of the relative speed of the object O increases. Accordingly, the driver can recognize, based on the object image 45, not only the relative position of the object O with respect to the wheeled vehicle 3 but also the relative speed of the object O with respect to the wheeled vehicle 3.

Further, the control device 17 increases the length of the object image 45 in the second direction as the dispersion of the relative position of the object O in the second direction increases. Accordingly, the driver can recognize, based on the object image 45, not only the relative position and relative speed of the object O with respect to the wheeled vehicle 3 but also the dispersion of the relative position of the object O (a moving degree of the object O with respect to the wheeled vehicle 3).

The control device 17 may perform the abovementioned deformation of the object image 45 at any time. For example, the control device 17 may display the deformed object image 45 at the start of the display thereof, or may deform the object image 45 after the start of the display thereof.

<The Change in the Color of the Object Image 45>

Next, the change in the color of the object image 45 will be described.

Upon recognizing the distance from the wheeled vehicle 3 to the object O based on the detection result of the external environment sensor 14, the control device 17 determines whether the distance from the wheeled vehicle 3 to the object O is equal to or more than a prescribed distance threshold. While determining that the distance from the wheeled vehicle 3 to the object O is equal to or more than the distance threshold, the control device 17 sets the color of the object image 45 to a first color. On the other hand, upon determining that the distance from the wheeled vehicle 3 to the object O is less than the distance threshold, the control device 17 changes at least one of the hue, brightness, and saturation of the object image 45, thereby changing the color of the object image 45 from the first color to a second color. For example, the second color is a color with higher brightness and/or saturation than the first color (a color that is more noticeable than the first color). However, in another embodiment, the second color may be a color with lower brightness and/or saturation than the first color (a color that is less noticeable than the first color).

As described above, upon determining that the distance from the wheeled vehicle 3 to the object O is less than the distance threshold, the control device 17 changes the color of the object image 45 as compared with a case where the control device 17 determines that the distance from the wheeled vehicle 3 to the object O is equal to or more than the distance threshold. Accordingly, the driver can recognize that the object O has approached the wheeled vehicle 3 based on the object image 45. In another embodiment, the control device 17 may change, according to the distance from the wheeled vehicle 3 to the object O, the color of the prospective image 46 and/or the past image 47 or both the color of the object image 45 and the color of the prospective image 46 and/or the past image 47.

When executing the travel control of the wheeled vehicle 3, the control device 17 sets the object O as the target of the travel control (for example, the preceding vehicle of the preceding vehicle following control) according to the positional relationship between the wheeled vehicle 3 and the object O. While the object O is not being set as the target of the travel control, the control device 17 sets the color of the object image 45 to a third color. On the other hand, the control device 17 changes the color of the object image 45 from the third color to a fourth color when the object O is set as the target of the travel control. For example, the fourth color is a color with higher brightness and/or saturation than the third color (a color that is more noticeable than the third color). However, in another embodiment, the fourth color may be a color with lower brightness and/or saturation than the third color (a color that is less noticeable than the third color).

As described above, when the object O is set to the target of the travel control, the control device 17 changes the color of the object image 45 as compared with a case where the object O is not set to the target of the travel control. Accordingly, the driver can recognize that the object O has been set as the target of the travel control based on the object image 45. In another embodiment, the control device 17 may change, according to whether the object O is set as the target of the travel control, the color of the prospective image 46 and/or the past image 47 or both the color of the object image 45 and the color of the prospective image 46 and/or the past image 47.

<The Change in the Number of Pattern Images 51 and 52>

Next, with reference to FIGS. 6A to 6C, the change in the number of pattern images 51 and 52 composing the prospective image 46 and the past image 47 will be described. The contents indicated by arrows X, Y, D1, and D2 in FIG. 6A are the same as the contents indicated by arrows X, Y, D1, and D2 in FIGS. 4A and 5A.

FIG. 6A shows a state where the wheeled vehicle 3 and the object O are moving in opposite directions. In this state, when the moving speed of the object O is V1, the control device 17 sets the number of pattern images 51 composing the prospective image 46 to N1 (see FIG. 6B). On the other hand, when the moving speed of the object O increases from V1 to V2, the control device 17 increases the number of pattern images 51 from N1 to N2 (see FIG. 6C). By contrast, when the moving speed of the object O decreases from V2 to V1, the control device 17 decreases the number of pattern images 51 from N2 to N1 (see FIG. 6B).

In the present embodiment, the control device 17 changes the number of pattern images 51 composing the prospective image 46 based on the moving speed of the object O. Thus, the driver can recognize, based on the prospective image 46, not only the prospective moving direction of the object O but also the moving speed of the object O. In another embodiment, the control device 17 may change, based on the moving speed of the object O, the number of pattern images 52 composing the past image 47, or both the number of pattern images 51 composing the prospective image 46 and the number of pattern images 52 composing the past image 47. Alternatively, in another embodiment, the control device 17 may change, based on the relative speed of the object O, the number of pattern images 51 composing the prospective image 46 and/or the number of pattern images 52 composing the past image 47.

<The Display Contents Setting Control>

Next, an example of the display contents setting control executed by the control device 17 will be described with reference to FIGS. 7 and 8. The display contents setting control is the control for determining the display contents of the surrounding image 41. When a plurality of objects O is present around the wheeled vehicle 3, the control device 17 may execute the display contents setting control for each object O.

When the display contents setting control is started, the control device 17 recognizes the object O present around the wheeled vehicle 3 based on the detection result of the external environment sensor 14 (step ST1). In another embodiment, the control device 17 may recognize the object O present around the wheeled vehicle 3 based on the object information received from the external device 4.

Next, the control device 17 determines whether the object O recognized in step ST1 is an object (hereinafter referred to as "the display target object") to be a display target in the surrounding image 41 (step ST2). For example, when the distance from the wheeled vehicle 3 to the object O is within a prescribed reference distance, the control device 17 determines that the object O is the display target object. On the other hand, when the distance from the wheeled vehicle 3 to the object O exceeds the reference distance, the control device 17 determines that the object O is not the display target object.

Upon determining that the object O recognized in step ST1 is not the display target object (step ST2: No), the control device 17 does not cause the HUD 16 to display the object image 45, the prospective image 46, and the past image 47 (step ST3). That is, the control device 17 does not cause the HUD 16 to display the relative position of the object O, the prospective moving direction of the object O, and the past moving direction of the object O.

On the other hand, upon determining that the object O recognized in step ST1 is the display target object (step ST2: Yes), the control device 17 acquires the past moving direction of the object O based on the detection result of the external environment sensor 14 (step ST4). In another embodiment, the control device 17 may acquire the past moving direction of the object O based on the object information received from the external device 4.

Next, the control device 17 estimates the prospective moving direction of the object O based on the detection result of the external environment sensor 14 (step ST5). In another embodiment, the control device 17 may estimate the prospective moving direction of the object O based on the object information received from the external device 4. Alternatively, the control device 17 may acquire, from the external device 4, the prospective moving direction of the object O estimated by the external device 4.

Next, the control device 17 recognizes the sight-line direction of the driver based on the imaging result of the onboard camera 15 (step ST6).

Next, the control device 17 determines whether the sight-line of the driver has been directed to the object O at least once within a prescribed period (step ST7) based on the relative position of the object O and the sight-line direction of the driver.

When the control device 17 determines that the sight-line of the driver has never been directed to the object O within the prescribed period (step ST7: No), the control device 17 causes the HUD 16 to display the object image 45 without causing the HUD 16 to display the prospective image 46 and the past image 47 (step ST8). That is, the control device 17 causes the HUD 16 to display the relative position of the object O without causing the HUD 16 to display the prospective moving direction of the object O and the past moving direction of the object O. In another embodiment, the control device 17 may cause the HUD 16 to display the relative position of the object O without displaying only one of the prospective moving direction of the object O and the past moving direction of the object O.

On the other hand, upon determining that the sight-line of the driver has been directed to the object O at least once within the prescribed period (step ST7: Yes), the control device 17 acquires a sight-line frequency based on the detection result of the external environment sensor 14 and the imaging result of the onboard camera 15, and determines whether the sight-line frequency is equal to or more than a prescribed frequency threshold (step ST9). The sight-line frequency is a frequency with which the sight-line of the driver is directed to the object O within the prescribed period (for example, the number of times the sight-line of the driver is directed to the object O within the prescribed period). The frequency threshold is set to an integer equal to or more than two.

Upon determining that the sight-line frequency is equal to or more than the frequency threshold (step ST9: Yes), the control device 17 acquires duration based on the detection result of the external environment sensor 14 and the imaging result of the onboard camera 15, and determines whether the duration is equal to or more than a prescribed time threshold (step ST10). The duration is a period during which the sight-line of the driver is continuously directed to the object O within the prescribed period. Upon acquiring plural pieces of duration within the prescribed period, the control device 17 may make the above determination by using the longest piece of duration among the plural pieces of duration, or make the above determination by using the total value of the plural pieces of duration.

Upon determining that the duration is equal to or more than the time threshold (step ST10: Yes), the control device 17 does not cause the HUD 16 to display the object image 45, the prospective image 46, and the past image 47 (step ST11). That is, the control device 17 does not cause the HUD 16 to display the relative position of the object O, the prospective moving direction of the object O, and the past moving direction of the object O.

On the other hand, upon determining that the duration is less than the time threshold (step ST10: No), the control device 17 causes the HUD 16 to display the object image 45 and the past image 47 without causing the HUD 16 to display the prospective image 46 (step ST12). That is, the control device 17 causes the HUD 16 to display the relative position of the object O and the past moving direction of the object O without causing the HUD 16 to display the prospective moving direction of the object O.

Further, upon determining in step ST9 that the sight-line frequency is less than the frequency threshold (step ST9: No), the control device 17 determines whether the duration is equal to or more than the time threshold, as in step ST10 (step ST13).

Upon determining that the duration is equal to or more than the time threshold (step ST13: Yes), the control device 17 causes the HUD 16 to display the object image 45 and the prospective image 46 without causing the HUD 16 to display the past image 47 (step ST14). That is, the control device 17 causes the HUD 16 to display the relative position of the object O and the prospective moving direction of the object O without causing the HUD 16 to display the past moving direction of the object O.

On the other hand, upon determining that the duration is less than the time threshold (step ST13: No), the control device 17 causes the HUD 16 to display the object image 45 and one of the prospective image 46 and the past image 47 (step ST15). That is, the control device 17 causes the HUD 16 to display the relative position of the object O and the prospective or past moving direction of the object O. For example, the control device 17 may calculate the priority of the prospective image 46 according to the difference between the sight-line frequency and the frequency threshold, calculate the priority of the past image 47 according to the difference between the duration and the time threshold, and cause the HUD 16 to display the prospective image 46 or the past image 47, whichever has the higher priority.

Upon setting the display contents of the surrounding image 41 in steps ST3, ST8, ST11, ST12, ST14, or ST15, the control device 17 returns to step ST1 and executes the display contents setting control again.

In the above embodiment, upon determining in step ST9 that the sight-line frequency is less than the frequency threshold (step ST9: No), the control device 17 determines whether the duration is equal to or more than the time threshold (step ST13). On the other hand, in a modified embodiment, as shown in FIG. 9, upon determining that the sight-line frequency is less than the frequency threshold in step ST9 (step ST9: No), the control device 17 may cause the HUD 16 to display the object image 45 and the prospective image 46 without causing the HUD 16 to display the past image 47 (step ST16). That is, the control device 17 may cause the HUD 16 to display the relative position of the object O and the prospective moving direction of the object O without causing the HUD 16 to display the past moving direction of the object O.

Further, in the above embodiment, after determining whether the sight-line frequency is equal to or more than the frequency threshold (step ST9: Yes), the control device 17 determines whether the duration is equal to or more than the time threshold (step ST10). In another embodiment, after determining whether the duration is equal to or more than the time threshold, the control device 17 may determine whether the sight-line frequency is equal to or more than the frequency threshold. That is, in another embodiment, the order of determination in step ST9 and determination in step ST10 may be reversed from the above-described embodiment.

<The Change in the Frequency Threshold and the Time Threshold>

Within a prescribed period including the time the sight-line of the driver is directed to the object O, the driving operation (for example, the steering operation, the acceleration operation, or the deceleration operation) of the wheeled vehicle 3 may be started in a state where the sight-line of the driver is not directed to the object O, and the changing amount of the driving operation may exceed a prescribed value after the sight-line of the driver is directed to the object O. Alternatively, within the prescribed period including the time the sight-line of the driver is directed to the object O, the driving operation (for example, the steering operation, the acceleration operation, or the deceleration operation) of the wheeled vehicle 3 may be started in a state where the sight-line of the driver is not directed to the object O, and the driving operation may be stopped after the sight-line of the driver is directed to the object O. In these cases, the control device 17 sets the frequency threshold to a first frequency F1 and sets the time threshold to a first time T1.

On the other hand, within the prescribed period including the time the sight-line of the driver is directed to the object O, the driving operation of the wheeled vehicle 3 may be started in a state where the sight-line of the driver is not directed to the object O, and the driving operation whose changing amount is equal to or less than the prescribed value may continue even after the sight-line of the driver is directed to the object O. In such a case, the control device 17 sets the frequency threshold to a second frequency F2 lower than the first frequency F1, and sets the time threshold to the second time T2 shorter than the first time T1.

In a case where the driving operation whose changing amount is equal to or less than the prescribed value continues even after the sight-line of the driver is directed to the object O, it is estimated that the driver is looking at the object O. In such a case, the frequency threshold is set lower or the time threshold is set shorter to prevent the prospective image 46 or the past image 47 from being displayed even though the driver is looking at the object O. Accordingly, the driver is less likely to feel annoyed by the prospective image 46 or the past image 47.

<The Type of the Recognition Error>

Next, with reference to FIG. 10, the type of the recognition error of the driver will be described.

In a case where the sight-line frequency is equal to or more than the frequency threshold, it is estimated that the driver looks at the object O again after taking his/her eyes off the object O. In such a case, the orbitofrontal cortex (a portion that plays an important role in decision-making) of the driver's brain tends to be activated, and it is considered that the driver accurately estimates the prospective moving direction of the object O. By contrast, in a case where the sight-line frequency is less than the frequency threshold, it is estimated that the driver cannot accurately estimate the prospective moving direction of the object O. Hereinafter, such a type of the recognition error of the driver will be referred to as "the first type". For example, in a case where the driver is driving the wheeled vehicle 3 while optimistically estimating the prospective moving direction of the object O (in a case where the driver is performing the so-called optimistic driving), the recognition error of the driver falls into the first type.

In a case where the recognition error of the driver falls into the first type, the control device 17 causes the HUD 16 to display the object image 45 and the prospective image 46 (step ST14) to assist the driver in estimating the prospective moving direction of the object O according to the sight-line frequency. The abovementioned "prospective moving direction" may include uncertainties.

In a case where the duration is equal to or more than the time threshold, it is estimated that the driver has been continuously looking at the object O for a long time. In such a case, the superior parietal lobule (a portion that plays an important role in spatial comprehension) of the driver's brain tends to be activated, and it is considered that the driver can spatially predict the movement of the object O. By contrast, in a case where the duration is less than the time threshold, it is estimated that the driver cannot spatially predict the movement of the object O. Hereinafter, such a type of the recognition error of the driver is referred to as "the second type". For example, in a case where the driver's visual estimation of the object O is incorrect, the recognition error of the driver falls into the second type.

When the recognition error of the driver falls into the second type, the control device 17 causes the HUD 16 to display the object image 45 and the past image 47 (step ST12) to assist the driver in recognizing the past moving direction of the object O according to the duration. Accordingly, the driver can recognize the past moving direction of the object O, thereby estimating the prospective moving direction of the object O on the presumption that the object O keeps on moving in the same way as before (that is, the definite prospective moving direction of the object O).

In a case where the sight-line of the driver has never been directed to the object O within the prescribed period, it is estimated that the driver is unaware of the object O. Hereinafter, such a type of the recognition error of the driver will be referred to as "the third type". For example, in a case where the driver overlooks the object O, the recognition error of the driver falls into the third type.

In a case where the recognition error of the driver falls into the third type, the control device 17 causes the HUD 16 to display the object image 45 without causing the HUD 16 to display the prospective image 46 and the past image 47 (step ST8). Accordingly, when the driver is unaware of the object O, the driver can be notified of the relative position of the object O with respect to the wheeled vehicle 3 by using a simple display. Accordingly, even if the object O is present not in a central vision (an area the driver is looking at) of the driver but in a circumferential vision (an area around the central vision) of the driver, it becomes easier for the driver to intuitively recognize the relative position of the object O with respect to the wheeled vehicle 3.

In particular, the HUD 16 displays the information about the object O such that the information about the object O at least partially overlaps with the forward view of the driver. Accordingly, when the types of the images displayed on the HUD 16 and the display area thereof increase, the images may obstruct the front view of the driver. As such, there is a great advantage in notifying the driver of the relative position of the object O with respect to the wheeled vehicle 3 by using a simple display.

As described above, the information display device 1 according to the present embodiment can provide information for the driver according to the driver's recognition state (recognition level) of the object O. Accordingly, it is possible to effectively assist the driver in driving the wheeled vehicle 3.

<Other Modifications>

In the above embodiment, the control device 17 causes the HUD 16 to display the object image 45. In another embodiment, the control device 17 does not have to cause the HUD 16 to display the object image 45. In such an embodiment, the control device 17 may use, on behalf of the object image 45, the object O in the actual space seen by the driver through the windshield 25, and display the prospective image 46 and/or the past image 47 at a position corresponding to the object O in the actual space.

In the above embodiment, the HUD 16 projects the information about the object O onto the windshield 25. In another embodiment, the HUD 16 may project the information about the object O onto a projection member (the so-called combiner) installed separately from the windshield 25 on an inside of the windshield 25.

In the above embodiment, the HUD 16, which includes the windshield 25 and the projecting device 26 that projects the information about the object O onto the windshield 25, is used as an example of the display unit. In another embodiment, a glass window, which includes a built-in transparent display having image display function, may be used as an example of the display unit. In other words, the display unit does not have to include the projecting device 26.

In the above embodiment, an automobile is used as an example of the mobile body. In another embodiment, a wheeled vehicle (such as a two-wheeled vehicle like a motorcycle and a self-balancing transporter) other than the automobile may be used as an example of the mobile body, or a vehicle other than the wheeled vehicle (a ship, an aircraft, or the like) may be used as an example of the mobile body. Furthermore, in another embodiment, the user himself/herself may be used as an example of the mobile body. In this case, the display unit may be provided on an article worn by the user (for example, a helmet worn by a rider of a two-wheeled vehicle or sunglasses worn by a pedestrian).

Concrete embodiments of the present invention have been described in the foregoing, but the present invention should not be limited by the foregoing embodiments and various modifications and alterations are possible within the scope of the present invention.

The invention claimed is:

1. An information display device, comprising:
    an object information acquiring unit configured to acquire at least position information about an object present around a mobile body;
    a sight-line information acquiring unit configured to acquire information about a sight-line of a user of the mobile body;
    a display unit configured to display information about the object such that the information about the object at least partially overlaps with forward view of the user; and
    a controller configured to control display of the display unit,
    wherein the controller is configured to
    estimate or acquire a prospective moving direction of the object based on an acquisition result of the object information acquiring unit,
    acquire a sight-line frequency based on the acquisition result of the object information acquiring unit and an acquisition result of the sight-line information acquiring unit, the sight-line frequency representing a frequency with which the sight-line of the user is directed to the object within a prescribed period,
    determine whether the sight-line frequency is equal to or more than a prescribed frequency threshold, and cause the display unit to display the prospective moving direction of the object at least on condition that the controller determines that the sight-line frequency is less than the frequency threshold, wherein the controller is configured to acquire a past moving direction of the object based on the acquisition result of the object information acquiring unit, acquire duration based on the acquisition result of the object information acquiring unit and the acquisition result of the sight-line information acquiring unit, the duration representing a period during which the sight-line of the user is continuously directed to the object within the prescribed period, determine whether the duration is equal to or more than a prescribed time threshold, and cause the display unit to display the past moving direction of the object at least on condition that the controller determines that the duration is less than the time threshold.

2. The information display device according to claim 1, wherein the controller is configured to determine whether the sight-line of the user has been directed to the object at least once within the prescribed period, and cause the display unit to display the prospective moving direction of the object at least on condition that the controller determines that the sight-line of the user has been directed to the object at least once within the prescribed period and that the sight-line frequency is less than the frequency threshold.

3. The information display device according to claim 1, wherein the controller is configured to cause the display unit to display a prospective image and a past image differently from each other, the prospective image indicating the prospective moving direction of the object, the past image indicating the past moving direction of the object.

4. The information display device according to claim 3, wherein the prospective image and the past image each include a plurality of pattern images arranged at an interval, and the controller is configured to change the number of the pattern images based on a moving speed of the object.

5. The information display device according to claim 1, wherein the mobile body is a vehicle, the user is a driver of the vehicle, the information display device further comprises an operation information acquiring unit configured to acquire information about a driving operation of the vehicle performed by the driver, and in a case where the driving operation is started when the sight-line of the user is not directed to the object and the driving operation whose changing amount is equal to or less than a prescribed value continues even after the sight-line of the user is directed to the object, the controller sets the time threshold shorter as compared with a case where the changing amount exceeds the prescribed value after the sight-line of the user is directed to the object or a case where the driving operation is stopped after the sight-line of the user is directed to the object.

6. The information display device according to claim 1, wherein the controller is configured to estimate the prospective moving direction of the object based on at least one of a type of the object, a position of the object, a moving speed of the object, a past moving direction of the object, and a surrounding environment of the object.

7. The information display device according to claim 1, wherein the mobile body is a vehicle, the user is a driver of the vehicle, the information display device further comprises an operation information acquiring unit configured to acquire information about a driving operation of the vehicle performed by the driver, and in a case where the driving operation is started when the sight-line of the user is not directed to the object and the driving operation whose changing amount is equal to or less than a prescribed value continues even after the sight-line of the user is directed to the object, the controller sets the frequency threshold lower as compared with a case where the changing amount exceeds the prescribed value after the sight-line of the user is directed to the object or a case where the driving operation is stopped after the sight-line of the user is directed to the object.

8. The information display device according to claim 1, wherein the controller is configured to cause the display unit to display an object image that indicates a relative position of the object with respect to the mobile body, and the object image is composed of a graphic image.

9. The information display device according to claim 8, wherein provided that a direction parallel to a moving direction of the object in a plan view is defined as a first direction, the controller is configured to increase a length of the object image in the first direction as a component in the first direction of a relative speed of the object with respect to the mobile body increases.

10. The information display device according to claim 9, wherein provided that a direction perpendicular to the moving direction of the object in the plan view is defined as a second direction, the controller is configured to increase a length of the object image in the second direction as a changing amount of the relative position of the object in the second direction with respect to the mobile body increases.

11. The information display device according to claim 8, wherein the controller is configured to acquire a past moving direction of the object based on the acquisition result of the object information acquiring unit, determine whether the sight-line of the user has been directed to the object at least once within the prescribed period, and cause the display unit to display the object image without causing the display unit to display at least one of the prospective moving direction of the object and the past moving direction of the object upon determining that the sight-line of the user has never been directed to the object within the prescribed period.

12. The information display device according to claim 1, wherein the controller is configured to determine whether a distance from the mobile body to the object is equal to or more than a prescribed distance threshold, and change a color of an image relating to the object upon determining that the distance from the mobile body to the object is less than the distance threshold.

13. The information display device according to claim 1, wherein the mobile body is a vehicle, the user is a driver of the vehicle, and the controller is configured to execute travel control of the vehicle, and change a color of an image relating to the object in a case where the object is set as a target of the travel control.

* * * * *